United States Patent [19]
Fulkerson

[11] 3,733,533
[45] May 15, 1973

[54] D. C. CHARGING SYSTEM

[76] Inventor: Clarence E. Fulkerson, 2012 N. 5th St., Ponca City, Okla. 74601

[22] Filed: Apr. 24, 1972

[21] Appl. No.: 246,828

[52] U.S. Cl. ............320/2, 240/10.6, 200/51.09
[51] Int. Cl. ..................H01m 45/04, F21l 7/00
[58] Field of Search ..................320/2-4, 320/25, 26, 15-19, 5, 6; 240/10.6, 10.68, 52.5; 200/51.07-51.09

[56] References Cited

UNITED STATES PATENTS

| | | | |
|---|---|---|---|
| 3,596,018 | 7/1971 | Elmes | 320/2 X |
| 3,612,853 | 10/1971 | Aoki | 240/10.68 |
| 2,293,284 | 8/1942 | Emanuel | 320/2 UX |
| 2,236,338 | 3/1941 | Emanuel | 320/2 UX |
| 3,005,090 | 10/1961 | Moore | 320/3 X |

Primary Examiner—J. D. Miller
Assistant Examiner—Robert J. Hickey
Attorney—William J. Miller

[57] ABSTRACT

A battery charging system which consists of a probe having opposite-facing conductive surfaces. The probe is insertable between the batteries. Charging current applied to the probe conductive surfaces will charge the battery. The probe can be attached to a bracket to provide a mounting for the battery-operated device.

4 Claims, 4 Drawing Figures

PATENTED MAY 15 1973 3,733,533

D. C. CHARGING SYSTEM

BACKGROUND OF THE INVENTION

Batteries are generally charged by removing them from the flashlight, radio or other device where they are used and inserting them in some type of charging apparatus. Some radios and special appliances which are generally connected to a source of A.C. power, provide an internal charging circuit which maintains the batteries in a charged condition. Appliances such as flashlights, however, have no provision for charging the batteries without physically removing the batteries as aforementioned.

The system described herein provides a means for charging a flashlight or the like without removing the batteries. The system also provides a means for retaining the flashlight during nonuse periods while maintaining the batteries in a charged state.

D.C. CHARGING SYSTEM

Figure 1:
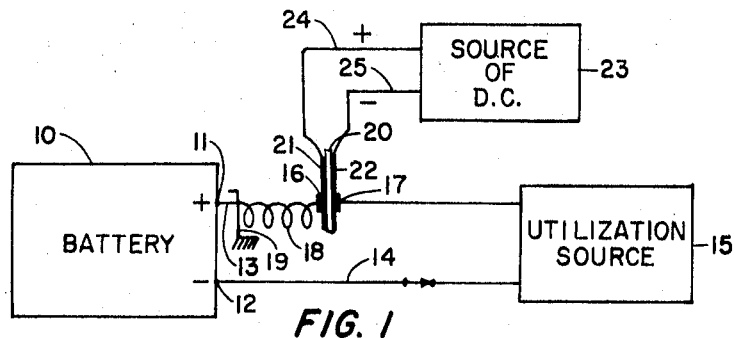
FIG. 1 is a schematic of a circuit embodying the charging means.

Referring to all of the drawings but in particular to FIG. 1, the system as shown is applied in its broadest sense. A battery 10 has output poles 11 and 12. These output poles are connected through wires 13 and 14, respectively, to a utilization source 15 which may, for example, be a flashlight bulb or a motor of some type. Interposed in series with wires 13 is a first and second pair of contacts 16 and 17. Contact 16 has a spring 18 biased between rigid support 19 and the contact 16. The invention comprises in addition to the contacts 16 and 17 a probe 20 having a conductive surface 21 and a second conductive surface 22. A D.C. source 23 is contacted through wires 24 and 25 to conductive surfaces 21 and 22, respectively.

In operation contacts 16 and 17 are normally closed by spring 18. The current can thus flow from battery 10 through wires 13 and 14 to the utilization source 15. When the system is to be charged, probe 20 is forced between contacts 16 and 17 urging contact 16 against spring biasing means to make good electrical contact with surfaces 21 and 22. D.C. source 23 will then supply current to battery 10 by passing current through wire 24, through contact 16, through wire 13, to battery 10, from battery 10, through wire 14, through the utilization source 15, again through wire 13, to contact 17, to surface 22, wire 25, and back to D.C. source 23. When D.C. source 23 is properly polarized with battery 10, the current will charge battery 10 and maintain it in a charged condition. When it is desired to use the utilization source, probe 20 is withdrawn from between contacts 16 and 17, and the system is serviceable.

Figure 2:
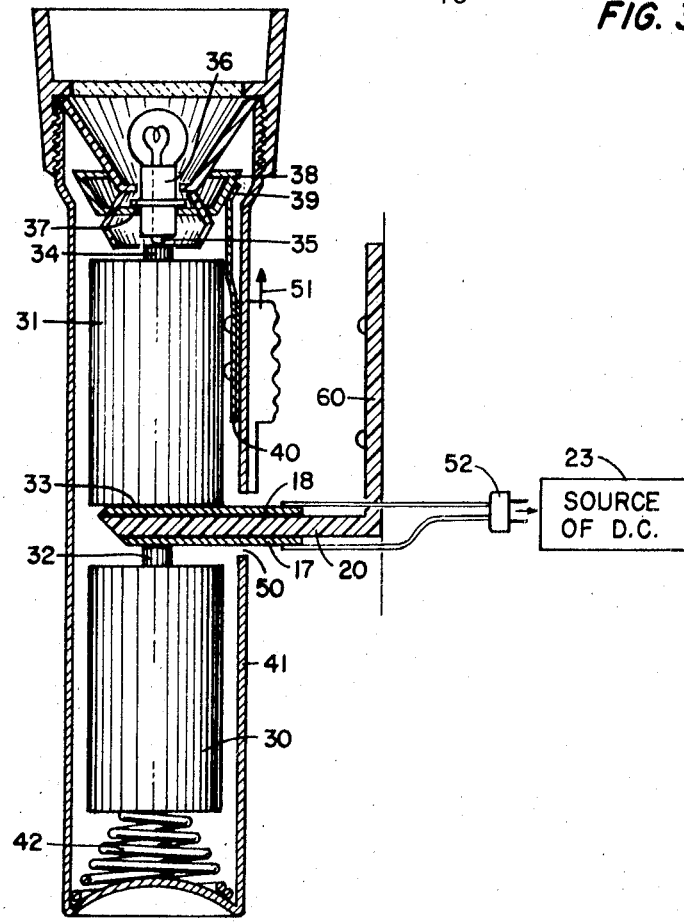
FIG. 2 is a flashlight having the charging means incorporated therein.

In FIG. 2 the application of the device to a flashlight is illustrated. Similar numbers will be used here for similar elements. A battery 30 is normally in contact with a battery 31. The positive terminal 32 of battery 30 will normally contact the negative terminal 33 of battery 31. A positive terminal 34 will make contact with one terminal 35 of a flashlight bulb 36. The other terminal 37 will contact a metal ring 38 which provides the switching surface for switch contact 39. The remaining end 40 of switch contact 39 makes contact with the case 41. Biasing spring 42 urges the flashlight battery 30 tightly against flashlight battery 31.

In operation probe 20 is forced through opening 50 between the negative pole 33 and the positive pole 32 of batteries 31 and 30, respectively. In order to complete the charging circuit, switch 40 must be moved in the direction of arrow 51 until contact 39 makes with ring 38. A plug 52 can be connected to a source of D.C. 23.

It is obvious, viewing the above, that D.C. source 23 could be a diode and voltage dropping system contained within probe 20. In that case plug 52 could be connected directly to a source of alternating voltage, such as the house wiring.

In operation the source of D.C. connected to probe 20 is applied through surface 18 to the negative pole 33 of battery 31. The charging current will pass from positive pole 34 through the flashlight battery to the other contact 37, through ring 38 and switch contact 39, to case 41, through biasing spring 42, to positive pole of battery 30 and to conductive surface 17, and back to the source of D.C. 23. Probe 20 can be mounted to a bracket 60 so that the flashlight can be retained at all times in a charging condition on a wall, for example, panel of a car, or other suitable location. The flashlight will also be in a charged condition while it is being retained on the bracket and will also be ready for use. The charging current need only be three to ten milliamperes and as such will be insufficient to light the bulb nor will the bulb as a consequence wear by continuous charging of the system. It is, of course, important that contact 39 make with ring 38 during the charging of the system, thus the switch must be in a closed condition during the charging of the battery.

Figure 4:
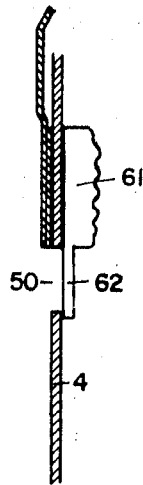
FIG. 4 is a partial cross-section of the switch portion of the flashlight illustrating a switch control means.

FIG. 4 illustrates one method of insuring that the switch be on while charging. In this embodiment the case 41 has an opening 50. Switch 61 has a cover portion 62 which will cover hole 50, keeping dust and dirt out of the flashlight when it is off bracket 60 and when it is turned off. Cover 62 also prevents, however, insertion of probe 20 with the flashlight in an off position, thereby insuring a proper charging circuit at all times.

Figure 3:
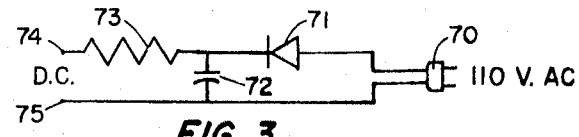
FIG. 3 illustrates one form of charging circuit.

In FIG. 3, a simple schematic of an ordinary charging circuit is illustrated which is well known in the art and comprises a plug 70, a rectifier 71, a filter capacitor 72, and voltage dropping and current limiting resistor 73. The D.C. is supplied to output terminals 74 and 75. The device is so well known that its operation need not be described.

It is obvious that this device can be used in other D.C. charging systems other than a flashlight as above particularly illustrated. Any system containing batteries which requires charging can have the probe as above described inserted in the circuit for the purpose of charging.

Other modifications may be made to the probe design and still be well within the skill of the art as described in the specification and appended claims.

I claim:

1. A charging and holding apparatus for a flashlight having a case, first and second batteries positioned in said case in series, and in voltage addition relationship, each battery having a positive pole and a negative surface, a bulb mounted in a reflection holder at one end of said case, spring means at the other end urging said batteries in electrical contact with each other, the bulb and the case, a switch means positioned to selectively interupt the series connection between said batteries and said bulb, comprising:

a. a probe having a first and second conductive surface on opposite sides of said probe electrically insulated from each other;

b. an opening through said case positioned in a plane with junction of the positive pole and the negative surface of said batteries and adapted to receive said probe therein;

c. means for mounting said probe on a surface; and d. a D.C. source electrically communicating with the conductive surfaces on said probe and poled to charge said battery.

2. An apparatus as described in claim 1 wherein said probe comprises an L-shapped member, one leg of said member having said conductive surfaces therein, said remaining member having means for mounting said probe to a suitable surface.

3. An apparatus as described in claim 1 wherein said probe has a sharpened end adapted to separate the battery poles to facilitate insertion between said batteries.

4. An apparatus as described in claim 1 wherein said switch has an extension of sufficient length to cover said opening when said switch is in the "off" position.

* * * * *